United States Patent [19]

Kostorz et al.

[11] Patent Number: 4,767,052
[45] Date of Patent: Aug. 30, 1988

[54] THERMOSTATICALLY SELF-REGULATING MIXING VALVE

[75] Inventors: Jan R. Kostorz, Menden; Dieter Kahle, Iserlohn, both of Fed. Rep. of Germany

[73] Assignee: Friedrich Grohe Armaturenfabrik GmbH & Co., Hemer, Fed. Rep. of Germany

[21] Appl. No.: 40,177

[22] Filed: Apr. 17, 1987

[30] Foreign Application Priority Data

Apr. 17, 1986 [DE] Fed. Rep. of Germany ....... 3612988

[51] Int. Cl.⁴ ............................................ G05D 23/13
[52] U.S. Cl. ................................................ 236/12.22
[58] Field of Search ................. 236/12.19, 12.16, 12.2, 236/12.21, 12.22

[56] References Cited

U.S. PATENT DOCUMENTS

| | | | |
|---|---|---|---|
| 2,369,242 | 2/1945 | Lawler | 236/12.2 |
| 3,929,283 | 12/1975 | Delpla | 236/12.2 |
| 3,955,759 | 5/1976 | Knapp | 236/12.2 |
| 4,029,256 | 6/1977 | Dauga | 236/12.2 |
| 4,607,788 | 8/1986 | Bendall et al. | 236/12.21 X |

Primary Examiner—William E. Tapolcai
Attorney, Agent, or Firm—Herbert Dubno; Andrew Wilford

[57] ABSTRACT

A self-regulating mixing valve has a main housing having hot- and cold-water inlets, compartments, and valve seats. A valve body is displaceable axially in the housing between one end position engaging the hot-water seat and an opposite end position engaging the cold-water seat, blocking flow from the cold-water inlet compartment to the outlet compartment, and out of engagement with the hot-water seat and permitting flow from the hot-water inlet compartment to the outlet compartment. On moving between these end positions the valve body passes through intermediate positions permitting flow from both inlet compartments past the respective seats into the outlet compartment. A fitting body fixed in the housing and defining a wall of the outlet compartment is formed with a throughgoing hole opening into the outlet compartment. A thermostat in the outlet compartment is fixed with the valve body to a tubular stem engaged through and limitedly axially movable in the hole of the fitting body. A seal ring engages around the stem to seal the hole and a spring is braced between the housing and the stem outside the outlet compartment to pull the thermostat and valve body into solid engagement with the fitting body. A temperature-selecting mechanism engages via the stem with the thermostat and operatively engages via the thermostat with the valve body.

6 Claims, 2 Drawing Sheets

THERMOSTATICALLY SELF-REGULATING MIXING VALVE

FIELD OF THE INVENTION

The present invention relates to a mixing valve. More particularly this invention concerns such a valve which is provided with an internal thermostat so that when set to a desired temperature it will automatically adjust itself to maintain this temperature.

BACKGROUND OF THE INVENTION

As described in German patent document 3,530,812 a thermostatic mixing valve intended for domestic bathroom use has a housing formed with separate hot- and cold-water input connections and with a tempered-water output connection typically carrying a faucet. A valve body in the housing can move between full-cold and full-hot end positions to admit hot and cold water in different ratios, depending on the desired setting which itself is established by an adjustment knob or lever. A thermostat, which term here means a device capable of changing position or shape dependent on temperature, can act on the valve body to move it so as to keep the temperature of the water downstream of the valve body constant. Normally this thermostat is braced by a return spring with the valve body against the temperature-setting device.

In such an arrangement this return spring, therefore, is downstream of the valve body. Thus water flows over and through it whenever the valve is in use. The result is, of course, that this part can lime up, corrode, or otherwise become nonoperational.

Furthermore, although modular valve construction is known from German patent document 3,239,772, in such thermostatic mixing valves any repairs normally entail substantial work with the actual valve housing itself. As a result servicing such a valve is fairly difficult.

OBJECTS OF THE INVENTION

It is therefore an object of the present invention to provide an improved thermostatically regulated mixing valve.

Another object is the provision of such a valve which is easier to service and less likely to need servicing than the prior-art such valves.

SUMMARY OF THE INVENTION

A self-regulating mixing valve according to the invention has a main housing having hot- and cold-water inlets respectively connectable to pressurized hot- and cold-water lines and having an outlet. This housing is formed with respective compartments connected to the inlets and outlet and with hot- and cold-water seats bounding the respective inlet compartments. A valve body is displaceable axially in the housing between one end position engaging the hot-water seat, blocking flow from the hot-water inlet compartment to the outlet compartment, and out of engagement with the cold-water seat and permitting flow from the cold-water inlet compartment to the outlet compartment and an opposite end position engaging the cold-water seat, blocking flow from the cold-water inlet compartment to the outlet compartment, and out of engagement with the hot-water seat and permitting flow from the hot-water inlet compartment to the outlet compartment. On moving between these end positions the valve body passes through intermediate positions permitting flow from both inlet compartments past the respective seats into the outlet compartment. A fitting body fixed in the housing and defining a wall of the outlet compartment is formed with a throughgoing hole opening into the outlet compartment. A thermostat in the outlet compartment is fixed with the valve body to a tubular stem engaged through and limitedly axially movable in the hole of the fitting body. A seal ring engages around the stem to seal the hole and a spring is braced between the housing and the stem outside the outlet compartment to pull the thermostat and valve body into solid engagement with the fitting body. A temperature-selecting mechanism engages via the stem with the thermostat and operatively engages via the thermostat with the valve body.

The movable parts of the thermostat and the spring therefore remain dry, or at least are not in the outlet compartment. A subassembly comprising the valve body and thermostat carried via the stem, which can be part of either the thermostat or the valve body, on the fitting body can therefore be withdrawn as a single unit for replacement or repair. Thus adjusting or assembling most of the critical valve parts can be done away from the valve housing.

Such an arrangement not only protects the elements of the valve and makes it easy to service them, but it also allows the valve to be made fairly short. It is possible for the unit to be set up as a wall-mount control or even incorporate it in a single-hole faucet.

According to another feature of this invention the stem is formed on the thermostat and the seal ring is engaged around the stem and recessed in the housing around the hole. The valve body is a tube having a hub engageable axially with the seal ring. As mentioned above the stem can also be formed on the valve body, in which case the thermostat is mounted on the hub.

In accordance with a further feature of this invention the thermostat has a tube extending axially through and displaceable axially in the stem in accordance with outlet-compartment temperature. The rod engages the mechanism outside the compartments. Furthermore the fitting body is formed on its side turned away from the outlet compartment with a bore into which the hole opens, into which the stem projects, and in which the spring is situated. The stem carries a nut against which the spring is braced. One of the seats is formed by the fitting body and the valve has a mixing tube forming the other seat and having an outlet end and a volume-control valve engageable with the outlet end.

DESCRIPTION OF THE DRAWINGS

The above and other features and advantages will become more readily apparent from the following, reference being made to the accompanying drawing in which.

SPECIFIC DESCRIPTION

Figure 1:
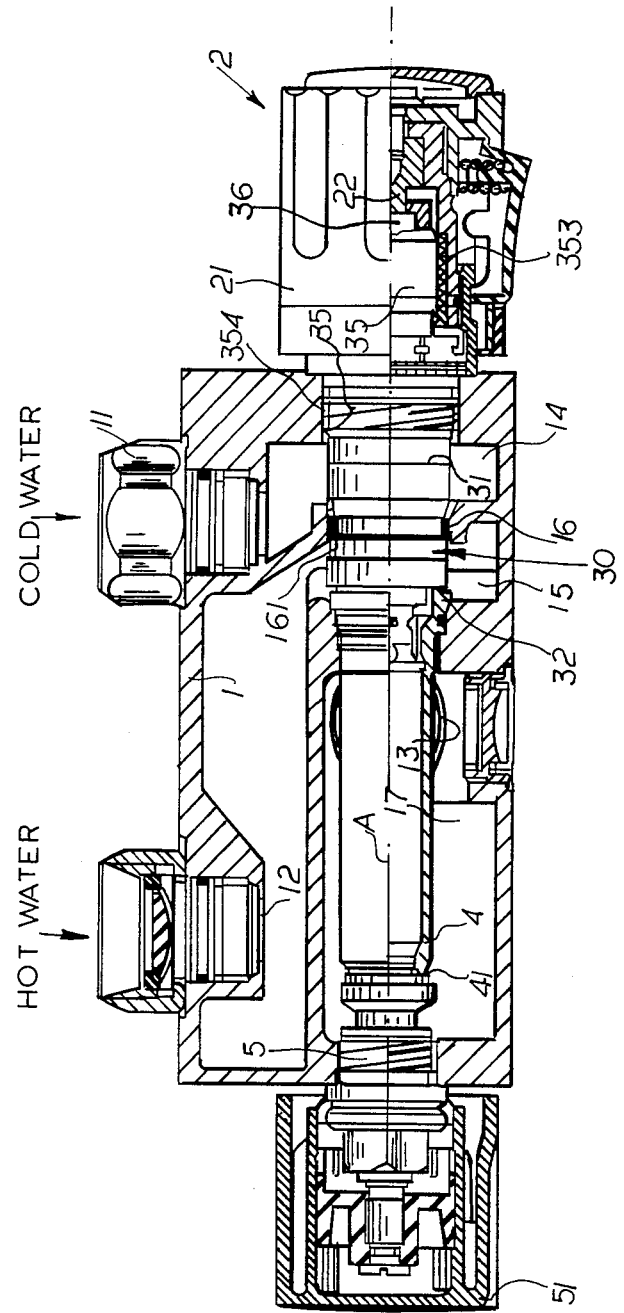
FIG. 1 is an axial section through the valve according to this invention.

The valve according to this invention has a cast-metal housing 1 that extends along an axis A extending right-to-left as seen in the drawing. This housing 1 is provided on its right-hand end with a cold-water input fitting 11 normally connected to a pressurized cold-water line and on its left with a hot-water input fitting 12 normally connected to a pressurized hot-water supply line. These fittings 11 and 12 open into respective axially spaced compartments 14 and 15 separated by a web 16 and capable of communicating with an output compartment 17 from which extends a faucet connection 13. Thus this is a wall-mount valve, although nothing precludes the instant invention from being used in a deck-mount, even a single-hole deck-mount faucet. To do so it would merely be necessary to shorten some of the structure somewhat.

A tubular valve body 30 is displaceable along the axis A in a cylindrical bore 161 through the web 16 separating the cold- and hot-water compartments 14 and 15 from each other. This valve body 30 moves axially from engagement with a hot-water seat 32 to engagement with a cold-water seat 31, through a total axial stroke of at most 1 mm. When engaged toward the left with the hot-water seat 32 all flow from the hot-water compartment 15 is cut off, and when the valve body 30 engages the cold-water seat 31, all flow from this compartment 14 is cut off. When intermediate these two axial end positions flow is from both these compartments 14 and 15 in a ratio depending on the axial position of the valve body 30 in the housing 1.

The cold-water seat 32 is formed by one end of a mixing tube 4 fixed in the housing 1 and the valve body 30 is formed as a tube so that any water flowing between either end of the valve body 30 and the respective seat 31 or 32 will be able to pass into this valve body 30 and thence into the mixing tube 4. The opposite end of this tube 4 forms a seat 41 for a standard volume-control valve 5 having a control knob 51 on the left-hand end of the housing 1. When open the valve 5 permits the combined flow in the tube 4 to exit the valve from the compartment 17 via the outlet 13.

On its right-hand end the valve is provided with a temperature-regulating unit 2 of the type described in above-mentioned German patent document 3,530,812. This unit 2 has a knob 21 rotatable to act on a control unit shown in detail in FIG. 2 and carrying a thermostat 3 that is normally at the upstream, here the right-hand, end of the mixing tube 4 so that it is exposed to the flow of hot and/or cold water and can react to the temperature thereof.

Thus the temperature is set at the knob 21 and the volume at the knob 51.

Figure 2:
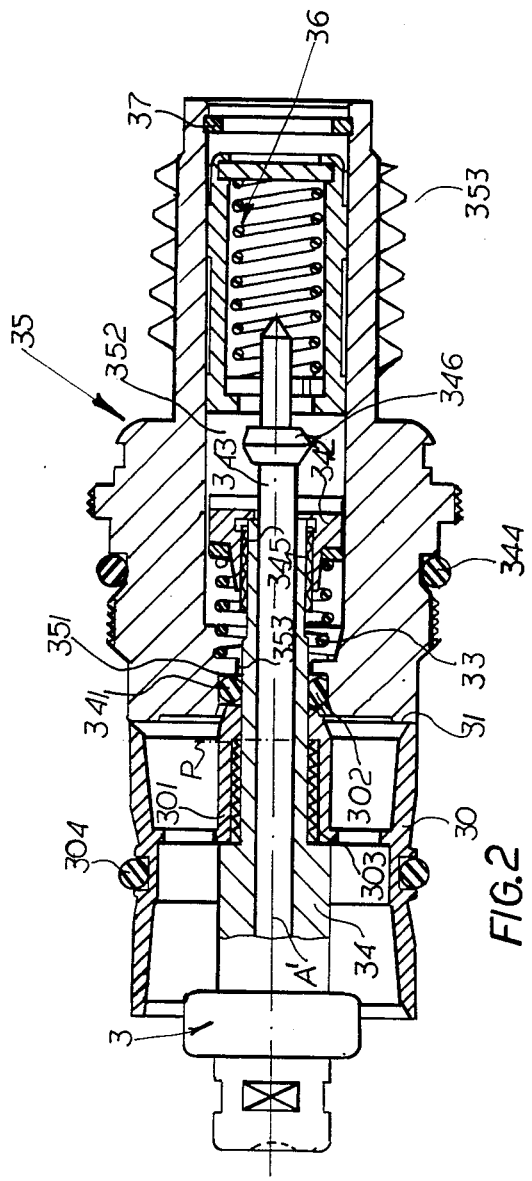
FIG. 2 is a large-scale view of the thermostat-valve insert for the valve of this invention.

As best seen in FIG. 2 the control unit has a fitting body 35 threaded axially into the right-hand end of the housing 1. More particularly screwthreads 354 serve to secure the body 35 on the housing 1 while screwthreads 353 serve for mounting the temperature adjuster 2 on the body 35. The left-hand end of the body 35 forms the cold-water seat 31 and an O-ring 344 seals between this body 35 and the housing 1.

The thermostat 3 has a tubular mounting stem 34 centered on the axis A and formed with a screwthread 303 that is threaded into a hub 301 formed unitarily with the valve tube 30 and centered on the axis A' thereof. Thus this stem 34 can be solidly mounted on the valve body 30. A thermostat rod 343 is axially slidable in the stem 34 and is moved axially to the right as seen in FIGS. 1 and 2 when the thermostat 3 is heated, and axially to the left as it is cooled.

It would also be within the scope of this invention to form the stem 34 to the right of the plane P of FIG. 2 integrally with the hub 301. Thus the thermostat 3 would have a short pin or stem screwed into the hub 301 which would itself be extended as the stem 34 through the body 35.

The right-hand end of the stem 34 is formed with a screwthread 345 on which is engaged a nut 342. A compression spring 33 is braced in a chamber 352 of the fitting body 35 axially between this nut 342 and a rightward-facing surface of the housing 35. Thus this spring 33 continuously pulls the stem 34 and the valve body 30 toward the right, bringing the valve body 30 into sealing engagement with the seat 31. The fitting body 35 is formed with an annular recess 351 open toward the valve hub 301. An O-ring 341 is normally compressed radially between the outer wall of this recess 351 and the side of the stem 34 and axially between the right-hand end 302 of the hub 301 and the floor of the recess 351.

The thermostat rod 343 is normally braced axially in the chamber 352 against the left-hand end of a force-limiting unit 36 whose right-hand end is engaged by the pusher 22 of the temperature adjuster 2. This unit 36 is basically a spring braced in a sleeve between two washers, one of which can move axially. The use of such a device prevents the adjuster 2 from exerting enough force on the thermostat 3 to damage it.

The use of two axially offset seal rings 304 and 341 to support the valve tube 30 respectively on the housing 1 and in the body 35 ensures that this valve body 30 will move only axially in the housing 1. This prevents it from canting and wedging, and ensures that good sealing contact will be made between the ends of the valve body and the respective seats 31 and 32.

The device is assembled as follows:

First of all the stem 34 of the thermostat 3 is threaded into the hub 30 until the right-facing shoulder of the stem 34 seats against this hub 301. Then the O-ring 341 is slipped over the stem 34 until it seats against the end 302 of the hub 3 and the stem 34 is fitted through the passage 353.

The spring 33 is then slipped inside the chamber 352 over the stem 34 and the nut 342 is threaded in place. The nut 342 is screwed down until the body 30 is pulled with the desired force against the seat 31.

The rod 343 is then slipped into the stem 34 until it engages the axially expansible and contractile body inside the thermostat 3, and the overpressure protector 36 is slid into the chamber 352 until the movable washer at its one end engages the ring 346 on this rod 343. A snap ring 37 is fitted into the mouth of the chamber 352, the O-rings 304 and 344 are fitted in place on the valve body 30 and fitting body 35, respectively, and the subassembly is complete.

The completed subassembly carried on the body 35 is screwed into the right-hand end of the bore of the housing 1, the adjuster 2 is threaded onto it, and the valve is complete. Replacement or servicing of any of these parts is fairly simple as the only elements exposed to substantial wear—the valve body 30 and thermostat 3—are easily removable. The repair or replacement of any of these parts can be carried out apart from the valve housing 1, making repairs relatively simple.

The adjuster 2 has a steep screwthread 353 that is used to apply axial pressure on the rod 343, pushing it to the right for cooler output water and vice versa. The thermostat 3 in effect sets the position of the valve body 30 relative to that of the adjuster so that it can adjust for different water temperatures, automatically regulating the sizes of the flow cross section for hot and cold water to maintain the desired temperature.

I claim:

1. A self-regulating mixing valve comprising:
a main housing having hot- and cold-water inlets respectively connectable to pressurized hot- and cold-water lines and having an outlet, the housing being formed with respective compartments connected to the inlets and outlet and with hot- and cold-water seats bounding the respective inlet compartments;
a valve body displaceable axially in the housing between
one end position engaging the hot-water seat, blocking flow from the hot-water inlet compartment to the outlet compartment, and out of engagement with the cold-water seat and permitting flow from the cold-water inlet compartment to the outlet compartment and
an opposite end position engaging the cold-water seat, blocking flow from the cold-water inlet compartment to the outlet compartment, and out of engagement with the hot-water seat and permitting flow from the hot-water inlet compartment to the outlet compartment, and through
intermediate positions permitting flow from both inlet compartments past the respective seats into the outlet compartment;
a fitting body fixed in the housing, defining a wall of the outlet compartment, and formed with a throughgoing hole opening into the outlet compartment;
a thermostat in the outlet compartment;
a tubular stem fixed to the thermostat and in the valve body and engaged through the hole of the fitting body, the stem being limitedly axially movable in the hole;
means for sealing the hole around the stem;
a spring braced between the fitting body and the stem outside the outlet compartment and inlet compartments and pulling the thermostat and valve body into solid engagement with the fitting body, the seal means preventing water in the compartments from leaking around the stem to the spring; and
a temperature-selecting mechanism including an axially displaceable rod engageable through the stem with the thermostat and operatively engageable via the thermostat with the valve body, the rod being shielded by the thermostat and stem from contact with water in any of the compartments.

2. The self-regulating mixing valve defined in claim 1 wherein the rod extends axially through and is displaceable axially in the stem in accordance with outlet-compartment temperature.

3. The self-regulating mixing valve defined in claim 1 wherein the fitting body is formed on its die turned away from the outlet compartment with a bore into which the hole opens, into which the step projects, and in which the spring is situated, the stem carrying a nut against which the spring is braced.

4. The self-regulating mixing valve defined in claim wherein one of the seats is formed by the fitting body, the 2 valve further comprising:
a mixing tube forming the other seat and having an outlet end; and
a volume-control valve engageable with the outlet end.

5. A self-regulating mixing valve comprising:
a main housing having hot- and cold-water inlets respectively connectable to pressurized hot- and cold-water lines and having an outlet, the housing being formed with respective compartments connected to the inlets and outlet and with axially spaced hot- and cold-water seats bounding the respective inlet compartments;
a tubular valve body displaceable axially in the housing between
one end position engaging the hot-water seat, blocking flow from the hot-water inlet compartment to the outlet compartment, and out of engagement with the cold-water seat and permitting flow from the cold-water inlet compartment to the outlet compartment and
an opposite end position engaging the cold-water seat, blocking flow from the cold-water inlet compartment to the outlet compartment, and out of engagement with the hot-water seat and permitting flow from the hot-water inlet compartment to the outlet compartment, the body being displaceable through intermediate positions permitting flow from both inlet compartments past the respective seats into the outlet compartment;
a fitting body fixed in the housing, defining the cold-water seat and a wall of the outlet compartment, and formed with a throughgoing hole opening into the outlet compartment;
a thermostat in the outlet compartment;
a tubular stem fixed to the thermostat and valve body and engaged through the hole of the fitting body, the stem being limitedly axially movable in the hole;
a seal ring in the hole around the stem;
a spring surrounding the stem outside the outlet compartment and inlet compartments, braced between the fitting body and the stem outside the outlet compartment, and pulling the thermostat and valve body into solid engagement with the fitting body, the seal ring preventing water in the compartments from leaking around the stem to the spring; and
a temperature-selecting mechanism including a rod engageable through the stem with the thermostat and operatively engageable via the thermostat with the valve body, the rod being shielded by the thermostat and stem from contact with water in any of the compartments.

6. A self-regulating mixing valve comprising:
a main housing having hot- and cold-water inlets respectively connectable to pressurized hot- and cold-water lines and having an outlet, the housing being formed with respective compartments connected to the inlets and outlet and with axially spaced hot- and cold-water seats bounding the respective inlet compartments;
a tubular valve body having a hub and displaceable axially in the housing between
one end position engaging the hot-water seat, blocking flow from the hot-water inlet compartment to the outlet compartment, and out of engagement with the cold-water seat and permitting flow from the cold-water inlet compartment to the outlet compartment and
an opposite end position engaging the cold-water seat, blocking flow from the cold-water inlet compartment to the outlet comaprtment, and out of engagement with the hot-water seat and permitting flow from the hot-water inlet compartment to the outlet compartment, the body being displaceable through intermediate positions permitting flow from both inlet compartments past the respective seats into the outlet compartment;

a fitting body fixed in the housing, defining the cold-water seat and a wall of the outlet compartment, and formed with a throughgoing hole opening into the outlet compartment;

a thermostat in the outlet compartment;

a tubular stem fixed to the thermostat and to the hub of the valve body and engaged through the hole of the fitting body, the stem being limitedly axially movable in the hole;

a seal ring in the hole around the stem;

a spring surrounding the stem outside the outlet compartment and inlet compartments, braced between the fitting body and the stem outside the outlet compartment, and pulling the hub of the thermostat into engagement with the seal ring and via this ring into solid engagement with the fitting body; and a temperature-selecting mechanism including an axially displaceable rod engageable through the stem with the thermostat and operatively engageable via the thermostat with the valve body.

* * * * *